UNITED STATES PATENT OFFICE.

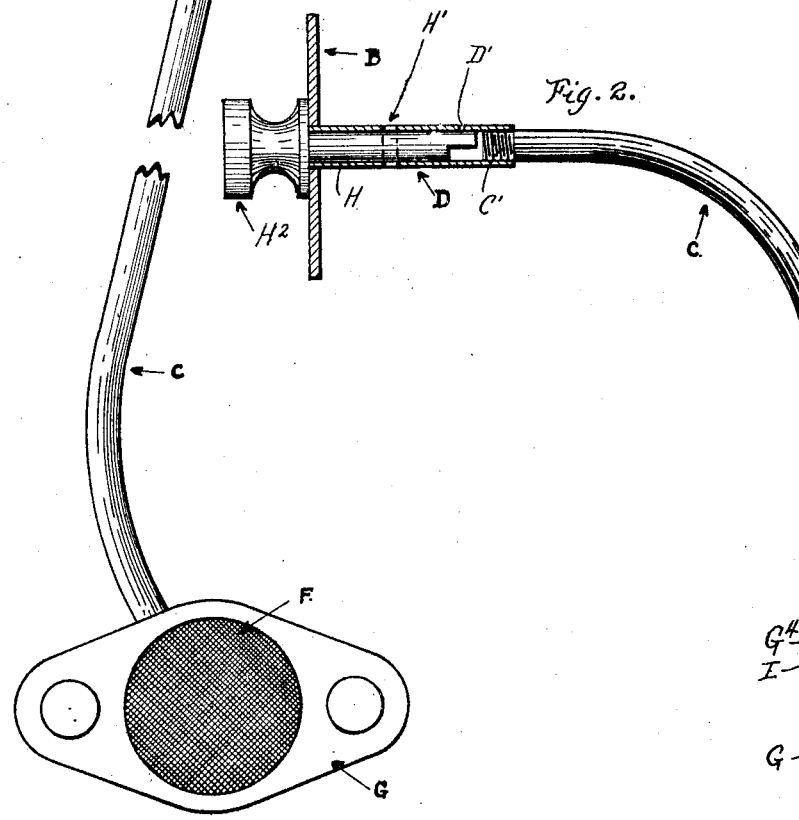

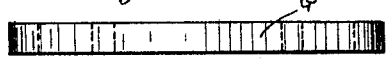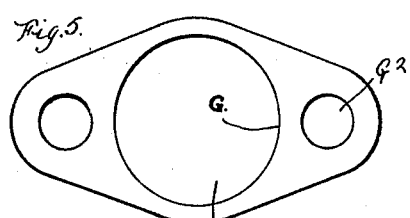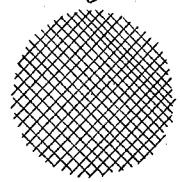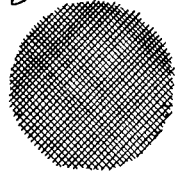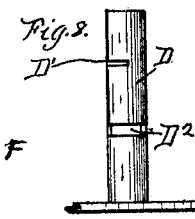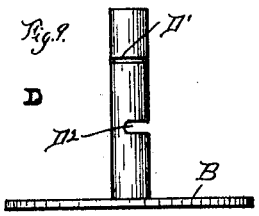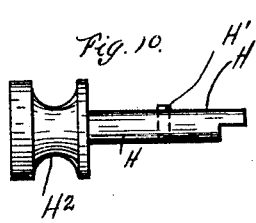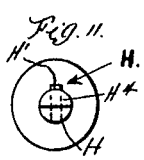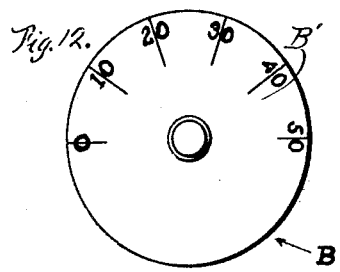

WESLEY E. STEPHENS, OF ELGIN, AND JOHN HOELZEL, OF CHICAGO, ILLINOIS.

AUXILIARY AIR-INLET DEVICE FOR EXPLOSION ENGINES.

1,407,494. Specification of Letters Patent. Patented Feb. 21, 1922.

Application filed October 24, 1919. Serial No. 333,104.

*To all whom it may concern:*

Be it known that we, WESLEY E. STEPHENS and JOHN HOELZEL, citizens of the United States, and residents, respectively, of Elgin, in the county of Kane, and State of Illinois, and of Chicago, in the county of Cook and State of Illinois, have invented new and useful Auxiliary Air-Inlet Devices for Explosion Engines, of which the following is a specification.

This invention relates to a novel auxiliary air inlet device for gasoline engines which is adapted to intimately intermix the air and hydrocarbon constituents of the gas before it enters the engine manifold and to furnish an auxiliary supply of air to the mixture on its way to the manifold, so as to thereby not only intimately intermix the constituents of the fuel furnished, as, for instance, from the carbureter, but also to vary the amount of air in the mixture to meet the requirements of power on the engine, to produce a powerful and smooth running motor operation and to increase the engine power from a given quantity of gasoline or other liquid fuel.

The auxiliary inlet device may, in accordance with my invention, be located between the carbureter and the intake manifold of the engine and may have the form of a suitable hollow gasket or head which is adapted to be fitted with air-tight joints between the carbureter and intake manifold. Said head or gasket is provided with a through opening, the ends of which are covered by screen so as to produce within the gasket or head a chamber transversely through which the mixture of air and fuel passes from the carbureter to the intake manifold, said chamber having a valved auxiliary inlet opening through which air, auxiliary to that supplied to the carbureter, may be introduced to said chamber and mixed with the fuel mixed in the carbureter. The auxiliary air supply is adapted to be delicately controlled by a suitable valve which may be located, if the device be applied to an automobile, at the dash of the automobile, so that the driver may readily manipulate the regulating valve, a pipe or conduit extending from the dash to the auxiliary inlet opening at the head or gasket to deliver air in variable quantities to the latter. The auxiliary inlet opens into the chamber in a direction transverse to the direction of the passage of the mixture through the chamber on its way from the carbureter to the intake manifold of the engine, and its angle of entrance is such as to cause the air thus admitted to said gasket or head to effect a swirling movement of the resultant fluid mixture so as to thereby better mix the fuel constituents and to break up the carbon constituents of the fuel before the mixture passes into the intake manifold.

As a further improvement, the screen walls at the opposite sides of the head and gasket of the chamber formed therein are of differential mesh, the screen wall on the carbureter side being of coarser mesh than that on the intake manifold side. The said screen on the carbureter side is made of sufficiently fine mesh to avoid tendency of the auxiliary air to pass backwardly into or towards the carbureter itself when the pressure in the carbureter side is lower than in the interior of the gasket and thereby produces pulsations which impede the free action of an accurately adjusted carbureter. The screen wall on the intake manifold side of the chamber is made of such fineness as to finely divide the carbon constituent of the fuel so as to intimately mix the same with the air. With this construction and arrangement, it becomes possible to variably admit auxiliary air supply to the head or gasket so as to graduate the mixture with respect to its percentage of air and carbon constituents as is necessary or desirable to suit the different working conditions of the engine.

I find there is a tendency for some of the gas coming down from the auxiliary pipe to shunt toward the carbureter unless there be a screen on the carbureter side. I employ two screens: first, in order to secure the successful dividing up of the mixture, and second, to confine the mixture coming in from the carbureter until there has been time for it to mix with the auxiliary inlet air. The finer mesh screen has the effect of momentarily slowing down the speed of the mixture so as to give it plenty of time and opportunity to mix with the air going through the pipe or conduit connected with the chamber between the screens. There happens, therefore, at the gasket or head, three things:

First, a breaking-up of the original mixture by the larger mesh screen.

Second, the mixing-up of the broken-up mixture with the auxiliary air while in the chamber of the head or gasket.

Third, the breaking-up of the second mixture which passes from the head or gasket as it come through the finer screen into the manifold.

It has been found in practice that this produces a mixture of gas and air which materially raises the mileage on a gallon of gas, actual experience giving as much as thirty-three and one-third per cent increase.

In the drawings is shown one embodiment of the invention, which will hereinafter be described in detail, but it will be understood that the structure is capable of variations within the spirit and scope of the claims hereto attached and that the invention is not limited to the particular embodiment shown, except as to claims where the particular construction is set forth and as imposed by the prior art.

In the drawings:

Figure 1 is a rear elevation, with parts broken away, of a device embodying our invention.

Figure 2 is a side elevation thereof with parts in section.

Figure 3 is a side elevation of the conduit leading from the valve intake end to the chambered gasket.

Figures 4 and 5 are top plan and side elevations, respectively, of the head or gasket.

Figures 6 and 7 illustrate the screen walls of the gasket, respectively, at the carbureter and intake manifold sides of the gasket or head.

Figures 8 and 9 are elevations of the valve casing or sleeve at the outer end of the conduit shown in Figure 3.

Figure 10 is a side elevation of the valve associated with the casing or sleeve shown in Figures 8 and 9.

Figure 11 is an end view thereof.

Figure 12 is an elevation of the dial which, as herein shown, is made a fixed part of the sleeve or casing shown in Figures 8 and 9.

As shown in said drawings, G designates a gasket or head of oblong form. It is provided centrally with an enlarged opening $G^1$ and at its ends with bolt openings $G^2$ whereby it may be bolted to flanged conduits associated with the carbureter and manifold intake conduits; it being understood that the opening $G^1$ will be in line with said conduits.

E, F designate screens which are adapted to be applied over the ends of the opening $G^1$ on the carbureter and manifold intake sides, respectively, of the gasket or head G, so as to form between them within said head or gasket a chamber $G^3$; the screens being soldered or otherwise secured to the head or gasket. The flanged fittings of the conduits associated with the carbureter and intake manifold are not herein shown but it will be understood that such conduits may have flanges corresponding to the general shape of the head or gasket G and that the latter is interposed therebetween and by some suitable packing means gas-tight joints are formed between the parts.

The said gasket or head is provided at one side with an auxiliary air inlet opening $G^4$ which discharges into the chamber $G^3$ in a direction transverse to the passage of the mixture of air and fuel through said chamber and tangentially relatively to said chamber.

C designates a pipe or conduit that is connected at one end to the gasket or head at the opening $G^4$. When the device is to be employed in connection with an automobile engine the said pipe or conduit C extends backwardly to the dash of the vehicle and is provided at its rear end with a threaded portion $C^1$ which is connected to a shell or sleeve D which, in practice, will extend from the dash and in rear thereof at or near the mounting board. The said shell or casing D is best shown in Figures 2, 8, and 9. It is provided near its connection with the conduit C with a narrow slot $D^1$ disposed, as herein shown, about 180 degrees around the circumference of the sleeve or casing, and constitutes the narrow auxiliary air inlet port of said sleeve or casing. B designates a dial that is fixed to one end of said sleeve or casing D and will usually be located just in rear of the dash of the vehicle. H designates a cylindric valve piece that is seated within the shell or casing D and is adapted to be rocked therein throughout a definite angular distance, which is established by a pin or stop $H^1$ on the valve piece that plays through a part-cylindric slot $D^2$ formed in the shell or casing between the port $D^1$ and the dial B. The said valve H is provided with an operating head $H^2$ which is flanged to bear against the rear face of the dial B and is provided with a pointer $H^3$ (Figure 1) that is adapted to cooperate with a scale $B^1$ on the dial, as best shown in Figure 1. The said slot $D^2$ is herein shown as made approximately 180 degrees in length so that the rocking or angular movement of the valve piece H in the shell or casing D is correspondingly limited. The said valve piece is provided at its forward end with a part-cylindric or eccentric extension $H^4$ which, in certain positions of the valve piece, overlaps the narrow inlet port $D^1$ of the valve casing or shell D. The stop $H^1$ is so related to the extension $H^4$ and to the walls of the guide and limiting slot $D^2$ and said extension H⁴ is so related to the narrow inlet port D¹ that said circumferentially elongated port D¹ is adapted to be gradually opened as the part-cylindric extension H⁴ uncovers the same by rotation of the valve piece H, and to be fully opened when the stop H¹ engages one end of the slot D² of the shell or casing and to be fully closed when said stop engages the other end of said guiding and limiting slot.

With the construction described it will be observed that the mixture from the carbureter passes directly through the opening G¹ of the head or gasket G on its way to the intake manifold. The said mixture first encounters the coarser screen wall E and thereby the carbon constituent of the mixture is partly broken up and further mixed with the air constituent of the mixture; and as the mixture passes through the finer mesh screen wall F the carbon constituent of the mixture is more finely broken up and more intimately mixed with the air constituent of the fuel. If now the auxiliary inlet valve at the end of the conduit C be open air will be admitted through the opening G⁴ to the chamber G³ of the head or gasket and in a direction transverse to the natural flow of the fuel constituents from the carbureter to the manifold intake, and the pressure of the air thus admitted to said chamber at the angle intake will cause the contents of the chamber G³ to be given a swirling motion so as to thereby further intermix the constituents of the fuel from the carbureter and likewise further dilute the mixture from the carbureter to an extent due to the volume of air admitted to the chamber through the conduit C and the opening G⁴. The volume of air admitted through the conduit is controlled by the auxiliary air valve before described, and from the description of said air valve above noted, it will be apparent that this volume may be graduated to any degree desired within the range of the full opening of the port D¹. The coarser screen wall E has the effect to prevent a backflow of the auxiliary air into or towards the carbureter.

It will thus be seen that we have provided a device whereby the admixture of the air and carbon constituents of the fuel may be very delicately adjusted while permitting the carbon constituents of the fuel to be thoroughly broken up and intermixed with the air constituents and that the richness or leanness of the mixture may be varied to correspond to the power demanded of the engine.

We claim as our invention:

1. An auxiliary air inlet device for explosion engines comprising a narrow flat gasket having a through transverse opening and adapted to be interposed between the outlet of a carbureter and the intake of a manifold, with said transverse opening constituting part of the thoroughfare from the carbureter to the intake manifold, screens applied to the ends of said transverse opening to form a narrow chamber in the gasket bounded by said screens, an elongated air conduit entering said chamber across the flow of the fuel mixture and at an angle to said flow to cause the air and gas mixture to have a swirling movement in said chamber, and a regulating valve in the outer end of said air conduit at a point remote from said gasket and in a zone of clean air to control the inlet of air to said chamber, the meshes of the two screens being different with the mesh of the screen on the manifold side of the chamber substantially finer than that of the other screen.

2. An auxiliary air inlet device for explosion engines comprising a narrow flat gasket having a through transverse opening and adapted to be interposed between the outlet of a carbureter and the intake of a manifold, with said transverse opening constituting part of the thoroughfare from the carbureter to the intake manifold, screens applied to the ends of said transverse opening to form a narrow chamber in the gasket bounded by said screens, an elongated air conduit entering the upper side of said chamber in a direction substantially parallel to the plane of said screens and oblique to the plane of the axis of said chamber, the screen at the manifold side of said chamber being of substantially finer mesh than that of the other screen, and a finely graduated valve at the outer end of the pipe adjacent to the engine operator's position and in a zone of clean air to control inlet of air to said chamber.

Signed this 21st day of October 1919 in the City of Chicago, and county of Cook, and State of Illinois, U. S. A.

W. E. STEPHENS.
JOHN HOELZEL.

Witnesses:
 Elizabeth V. McMahon,
 Elizabeth V. McMahon.